Patented Sept. 13, 1932

1,876,943

UNITED STATES PATENT OFFICE

ANDREW J. HULL, OF LARAMIE, WYOMING, ASSIGNOR TO WYOMING PLATINUM AND GOLD MINING SYNDICATE, A TRUST

METHOD OF RECOVERING PLATINUM

No Drawing. Application filed April 17, 1931. Serial No. 531,015.

This invention relates to platinum-recovering processes and has for an object to provide a cold process of treating platinum-bearing ores to return from the concentrate a higher percentage of the platinum values than hitherto possible with the ordinary recovery methods.

A further object is to provide a process which will effect a chloride salt solution of the platinum concentrate and subsequently convert the precipitated solution into platinum sponge by a cold treatment.

The method which is the subject of the present invention applies generally to the production of sponge platinum from ores in which the platinum is usually found in nature alloyed with iridium, rhodium, palladium, iron, gold, copper, etc. The gangue of waste matter in which the platinum is locked usually contains such limiting elements as sulphur, carbon, phosphorus, nitrogen, arsenic, antimony, osmium, and the like, and these elements, being highly volatile, are oxidized and consumed by high temperatures or else are reduced to gases, in either case a high percentage of the platinum values being either destroyed or carried off as fumes with them.

The present invention provides a preliminary step of removing these limiting elements by roasting the concentrate under low temperature for a predetermined period of time, which treatment retains the platinum values undisturbed in the roasted concentrate for subsequent treatment.

The invention also provides a step in which the roasted concentrate, freed of limiting elements, is reduced, under carefully controlled heat and pressure conditions, to chloride platinum salts which alone are capable of being put in solution.

The invention also provides a step of putting the salts in solution under carefully controlled low temperatures, while maintaining the mass in motion throughout a predetermined period of time, the product then being ready for subsequent recovery of the platinum values by precipitation with zinc to produce platinum sponge.

For the purpose of a clear understanding of the invention, a specific example will be given, it being understood that modifications may be resorted to within the scope of the appended claims to accommodate the process to the various grades or types of material to be treated.

In carrying out the invention I first grind or pulverize the platinum-bearing ore and then concentrate the same by oil flotation in the usual way and by use of the usual apparatus. The concentrate is then ready for treatment in accordance with my invention, as follows.

The concentrate is placed in a reverberatory furnace and then roasted for about six hours more or less while being subjected to a comparatively low temperature of about 600° C. more or less. The limiting elements, as well as certain of the alloyed metals above enumerated, are reduced to gas during this roasting step and escape as fumes from the stack. Recovery of desired metals from the fumes may be made by cooling the fumes in the stack in the usual manner. It is found in practice that a much higher percentage of the platinum values remain undisturbed in the concentrate, roasted as above described, than when the concentrate is not so treated.

The roasted concentrate is next cooled by exposure to the atmosphere in pans.

The cooled concentrate is then mixed with five per cent salt by weight.

To reduce the salted concentrate to chlorine salts of platinum, the salted concentrate is placed in an air-tight retort or furnace to which chlorine gas is admitted. The temperature is gradually raised from about 200° C. to 550° C. during about a five-hour period of time, while the concentrate is taking up the chlorine. It is found in practice that the concentrate will require and absorb about 100 pounds of chlorine gas to each ton of concentrate. After saturation is reached, it will be noted that the pressure gage on the furnace rises rapidly, this indicating that the mass is not absorbing any more chlorine gas. When the pressure reaches about five pounds, the gas is shut off. Thereupon, after purging the furnace of chlorine gas with an air blast in the usual manner, the product may be removed for further treatment.

It will be observed that the mass is comparatively warm when taken from the chlorination furnace, the temperature being about 500° C. more or less. The chlorinated warm pulp, or, in other words, the mass of chloride salts of platinum, is then dropped into an agitator tank containing about seven tons of water to the ton of material. One-half to one per cent of hydrochloric acid is added. The mass is subjected to a temperature of from 118° F. to 130° F. while being agitated for about two hours. The platinum chloride salts go into solution while the gold, iron, and other metals remain in the pulp.

The solution and pulp is next run through a filter to separate the solution from the pulp. The filter may be of any type now in general use.

The filtered solution is next pumped into an agitating tank where there is added to the solution about five times the weight of calcium carbonate to the weight of copper in the solution, in order to precipitate the copper.

The mass is then again filtered to take out the calcium and copper from the solution.

The solution is then pumped to a precipitating plant, such as the Merrill Crow precipitating apparatus, where zinc dust is added to precipitate the platinum values. Preferably, equal parts of zinc by weight to platinum are employed. The platinum sponge in the nature of a black powder will be precipitated by the zinc.

The product is again filtered to recover the platinum sponge, and subsequently the remaining pulp may be treated for gold recovery by the usual cyanide, chloride, or amalgamation treatment.

It will be observed that throughout the process the temperatures are carefully controlled so that at no time will the temperature rise sufficiently to cause volatilization of the platinum values. In no step is the temperature allowed to rise over 600° C. which, as is well known, is a comparatively cool heat treatment.

Having thus described the invention, I claim:

1. A method of treating platinum-bearing ores to produce sponge platinum, which comprises roasting platinum-bearing concentrate for about six hours more or less under a temperature of about 600° C., subjecting the roasted warm product to chlorine gas to convert the mass into chloride salts of platinum, passing said salts into solution, and precipitating the solution with zinc.

2. A method of treating platinum-bearing ores to produce sponge platinum, comprising roasting platinum bearing concentrate slowly under comparatively low temperatures until the limiting elements are removed in gaseous form, cooling the mass, adding salt to the cooled mass, subjecting the salted mass to chlorine gas while maintaining a temperature in the mass of from 250° C. to 550° C. to produce chlorine salts of platinum, passing the chlorine salts of platinum into solution, and subsequently precipitating the solution with zinc.

3. A method of treating platinum-bearing ores to produce sponge platinum, comprising slowly roasting platinum-bearing concentrate under moderate temperatures to remove limiting elements, cooling the product, adding salt to the cooled product, subjecting the salted cooled mass to an atmosphere of chlorine gas in an air-tight retort for a period of about five hours and under a temperature of from 250° C. to 550° C. to convert the mass into chlorine salts of platinum, passing the mass of chlorine platinum salts into solution, and subsequently recovering the platinum values by precipitation of the solution with zinc to produce sponge platinum.

4. A method of treating platinum-bearing ores to produce sponge platinum, comprising slowly roasting platinum-bearing concentrate at low temperature to remove limiting elements without disturbing the platinum values, subjecting the mass to chlorine gas in an air-tight furnace under moderate temperatures for a period of time sufficient to produce saturation of the mass with the gas to convert the mass into chlorine salts of platinum, subjecting the chlorine salts of platinum while still warm to a bath of seven parts of water to one part of the mass to which about one-half per cent to one per cent of hydrochloric acid is added while maintaining a temperature of the mass of about 118° F. to 130° F. and simultaneously agitating the mass whereby to pass the salts into solution, and precipitating the solution with zinc to form sponge platinum.

5. A method of treating platinum-bearing ores to produce sponge platinum, comprising roasting platinum-bearing concentrate for a period of about six hours at a temperature of about 600° C. to remove limiting elements while retaining the platinum values, cooling the roasted mass and adding about five per cent of salt by weight, reducing the salted concentrate to chlorine salts of platinum by placing the salted mass in an air-tight furnace and subjecting the mass to chlorine gas while simultaneously maintaining a temperature of from 200° C. to 550° C. during about a five-hour period, passing the product into water solution of about seven parts of water to one part of the mass to which is added about one-half per cent to one per cent of hydrochloric acid while maintaining a temperature from 118° F. to 135° F., agitating the solution for about two hours, filtering the solution from the pulp, and subsequently precipitating the solution by zinc to produce sponge platinum.

6. A method of treating platinum-bearing ores to produce sponge platinum, comprising roasting platinum-bearing concentrate for about a six-hour period while subjecting the mass to a low temperature of about 600° C. to remove limiting elements as well as other volatile metals while retaining a high percentage of platinum values in the mass, reducing the mass to chlorine salts of platinum, passing said salts into solution, and precipitating the metal out of the salts.

7. A method of treating platinum-bearing ores to produce sponge platinum, comprising subjecting slowly roasted platinum-bearing concentrate to chlorine gas while maintaining a temperature of from 200° C. to 550° C. during about a five-hour period to reduce the mass to chlorine salts of platinum, passing said salts into solution, and precipitating the metal out of solution.

8. A method of treating platinum-bearing ores to produce sponge platinum, comprising the step of subjecting chlorine salts of platinum to a bath of water of substantially seven parts of water to one part of the mass to which is added about one-half per cent to one per cent of hydrochloric acid, and simultaneously maintaining a temperature therein of from 118° F. to 130° F.

In testimony whereof I affix my signature.

ANDREW J. HULL. [L. S.]